United States Patent
Wang et al.

(10) Patent No.: US 12,130,189 B2
(45) Date of Patent: Oct. 29, 2024

(54) HIGH DYNAMIC RANGE DISTRIBUTED TEMPERATURE SENSING (DTS) USING PHOTON COUNTING DETECTION

(71) Applicant: NEC Laboratories America, Inc., Princeton, NJ (US)

(72) Inventors: Qiang Wang, Princeton, NJ (US); Yaowen Li, Princeton, NJ (US)

(73) Assignee: NEC Corporation, Tokyo (JP)

( * ) Notice: Subject to any disclaimer, the term of this patent is extended or adjusted under 35 U.S.C. 154(b) by 686 days.

(21) Appl. No.: 17/191,622

(22) Filed: Mar. 3, 2021

(65) Prior Publication Data

US 2021/0318181 A1 Oct. 14, 2021

Related U.S. Application Data

(60) Provisional application No. 63/008,881, filed on Apr. 13, 2020.

(51) Int. Cl.
*G01K 11/324* (2021.01)
*G01J 3/44* (2006.01)

(52) U.S. Cl.
CPC .............. *G01K 11/324* (2021.01); *G01J 3/44* (2013.01)

(58) Field of Classification Search
CPC ......... G01K 11/32; G01K 11/324; G01J 3/44; G01D 5/35364
See application file for complete search history.

(56) References Cited

U.S. PATENT DOCUMENTS

| 7,049,574 B1* | 5/2006 | Takeuchi | H04L 9/0852 |
| | | | 250/214 R |
| 2007/0171402 A1* | 7/2007 | Watley | G01K 11/32 |
| | | | 356/73.1 |
| 2013/0156066 A1* | 6/2013 | Kwon, II | G01K 11/32 |
| | | | 374/161 |

OTHER PUBLICATIONS

Vilella et al Gated Geiger mode avalanche photodiode pixels with integrated readout electronics for low noise photon detection, Nuclear Instruments and Methods in Physics Research Section A: Accelerators, Spectrometers, Detectors and Associated Equipment, vol. 695, pp. 218-221, ISSN 0168-9002 (Year: 2012).*

Phillip Gatt, Steven Johnson, Terry Nichols, "Dead-time effects on geiger-mode APD performance," Proc. SPIE 6550, Laser Radar Technology and Applications XII, 65500I (May 4, 2007); https://doi.org/10.1117/12.724773 (Year: 2007).*

(Continued)

*Primary Examiner* — Uzma Alam
*Assistant Examiner* — Jonathon Cook
(74) *Attorney, Agent, or Firm* — Joseph Kolodka

(57) ABSTRACT

Aspects of the present disclosure describe distributed fiber optic sensing systems (DFOSa), methods, and structures for distributed temperature sensing (DTS) that 1) employs a GmAPD instead of a traditional LmAPD detector which advantageously produces a 10~20 dB gain improvement of SNR for a far-end weak signal, thereby improving long range detectability; 2) employs an inventive gating scheme that advantageously and surprisingly overcomes the "dead time" problem for GmAPD working in SPC mode that plagues Geiger mode operation; and 3) third, employs an inventive post-processing technique that advantageously allows our methods to correct any dark noise caused signal distortion.

3 Claims, 2 Drawing Sheets

(56) References Cited

OTHER PUBLICATIONS

D. Renker, Geiger-mode avalanche photodiodes, history, properties and problems, Nuclear Instruments and Methods in Physics Research Section A: Accelerators, Spectrometers, Detectors and Associated Equipment, vol. 567, Issue 1, pp. 48-56, ISSN 0168-9002, https://doi.org/10.1016/j.nima.2006.05.060. (Year: 2006).*

Itzler et al. Advances in InGaAsP-based avalanche diode single photon detectors. Journal of Modern Optics. Jan. 31, 2011, vol. 58, No. 3-4 (Year: 2011).*

* cited by examiner

HIGH DYNAMIC RANGE DISTRIBUTED TEMPERATURE SENSING (DTS) USING PHOTON COUNTING DETECTION

CROSS REFERENCE

This disclosure claims the benefit of U.S. Provisional Patent Application Ser. No. 63/008,881 filed 13 Apr. 2020 the entire contents of which is incorporated by reference as if set forth at length herein.

TECHNICAL FIELD

This disclosure relates generally to distributed fiber optic sensing (DFOS) systems, methods, and structures. More specifically, it pertains to high dynamic range distributed temperature sensing (DTS) using photon counting detection.

BACKGROUND

Recently, distributed fiber optic sensing (DFOS) techniques have proven quite useful in a number of contemporary applications. One particular DFOS technique—distributed temperature sensing (DTS)—has proven particularly useful in applications including—but not limited to—oil and gas production, power cable and transmission line monitoring, fire detection, industrial surveillance, integrity of liquid natural gas (LNG) carriers and terminals, and temperature monitoring in plant and process engineering—among others.

Given such importance and applicability, improvements in DTS would be a welcome addition to the art.

SUMMARY

An advance in the art is made according to aspects of the present disclosure directed to distributed temperature sensing systems (DTS), methods, and structures that advantageously employ single photon counting (SPC), Geiger mode avalanche photodiode (GmAPD) detectors.

According to certain aspects of the present disclosure—and in sharp contrast to the prior art—DTS systems, methods, and structures which employ SPC GmAPD detectors according to the present disclosure: 1) apply a gating signal to the breakdown voltage to limit the sensitivity of the GmAPD detector under high-intensity light condition(s), and 2) use a custom controlled gate algorithm that produces a gating rate that is inversely proportional to the light intensity.

BRIEF DESCRIPTION OF THE DRAWING

A more complete understanding of the present disclosure may be realized by reference to the accompanying drawing in which.

DESCRIPTION

Figure 1:
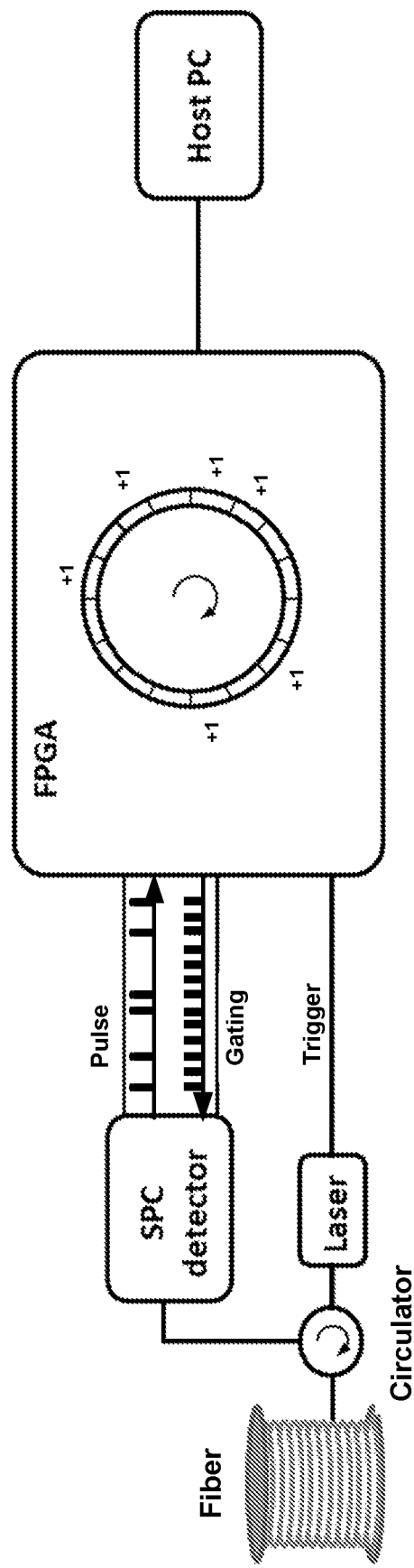
FIG. 1 is a schematic diagram showing an illustrative single photon counting (SPC) detector based high dynamic range (HDR) distributed temperature sensing (DTS) system according to aspects of the present disclosure.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we begin by noting that Raman-based distributed temperature sensing (DTS) is a distributed optical fiber sensing (DOFS) technique used to measure temperature along a length of sensing fiber. Operationally, a DTS system sends a short laser pulse along the sensing fiber and collects Raman-based backscattered light. The received light has temperature information in its intensity that is proportional to a number of reflected photons and location information derived from a time-of-flight of the light. After processing including calibration and calculation, the temperature may be obtained at points along the length of the fiber.

Common—prior art—DTS systems use linear mode APD (LmAPD) in which a detector output signal amplitude is proportional to a detected light intensity to convert scattered light to an electrical signal. The electrical signal is then digitized at a high sampling rate thereby restoring amplitude and time information.

Note that a collected signal is accompanied with a high level of noise that mostly originates from APD and electronics circuits. An averaging algorithm is normally used to improve the signal to noise ratio assuming that the noise is mostly of a white noise variety.

A weak signal results at a far-end portion of fiber due to limitations of the input pulse power and attenuation of both the input pulse and scattered return signal. For configurations involving a long length fiber, the noise level could be much larger than signal itself.

In such high noise situations, aggressive averaging of over 1 M sampling is oftentimes used to improve the measurement signal to noise ratio (SNR) or reduce the statistical error of measurement. Unfortunately, however, such high sampling is not practical for a long-range measurement as the time required to repeat a measurement is too long and the weak signal at the far-end of the fiber.

Note that other techniques such as coding and denoising can improve the far-end SNR, but only to certain degree and often produce other undesirable effects such as spatial resolution degradation. With a reasonable temperature noise at the far end and 2 m spatial resolution, a LmAPD based DTS may reach a maximum distance of 40 km.

As we now describe—and according to aspects of the present disclosure—Geiger mode APD detectors (GmAPD) can be configured to operate in a single photon counting (SPC) mode. Advantageously, such SPC mode operation helps to distinguish a signal from noise in a low signal environment and improve the detectability of low light while still providing a SNR improvement of 10~20 dB.

According to aspects of the present disclosure, systems, methods, and structures advantageously employ a GmAPD and associated circuitry to record individual photon events with precise time stamp information (SPC mode). The time stamp information can be used to permit operation over a longer time interval. Additionally, more data acquisition cycles may be employed to reduce any statistical error associated with measured physical parameters.

As will be understood and appreciated by those skilled in the art, by employing these features, the GmAPD enables systems, methods, and structures according to aspects of the present disclosure to detect much weaker signal(s) than the prior art LmAPD. With specific application to a DTS application, this allows measurement of a far end of a much longer sensing fiber than is possible with the prior art LmAPD systems. Operationally, systems, methods, and structures according to aspects of the present disclosure exhibit an improved measurement range from 40 km to 60 km with a single mode fiber (SMF) cable while also maintaining a surprisingly good spatial resolution.

Notwithstanding such optimistic results, we note that when applying an SPC detector according to aspects of the present disclosure, we have determined that—if used directly—a GmAPD exhibits two drawbacks for long range DTS applications.

First, GmAPD exhibits a limited maximum count rate, usually 10~100 MHz. In other words, there is a "dead time" window of 10~100 ns after each avalanche process for the GmAPD to reset.

Second, there is a drawback related to the dark noise of GmAPD which is usually on the order of kHz. More specifically, this dark noise signal cannot be discriminated from the true photon signal. This drawback impacts the far-end portion of fiber as the true photon count rate may be comparable to dark noise.

As we shall describe in further detail, we advantageously overcome the first limitation, by applying a gating signal to breakdown voltage to limit the sensitivity of the detector under high intensity light conditions.

To overcome the second limitation, we advantageously implement a custom controlled gate algorithm that produces a gating rate that is inversely proportional to light intensity. For a near-end portion, the gating rate is lower than the actual photon rate resulting in a reduced sensitivity. At the far-end, the gating rate is higher—thereby ensuring that most of the photons are detected.

Advantageously, with systems, methods, and structures according to aspects of the present disclosure, a true count rate can be recovered with correction on detection efficiency caused by the gating algorithm. Importantly, detector dark noise rate is constant if working parameters and operating environment of the detector remain the same. Consequently, a dark noise rate can be measured without a signal present and the statistical error can be reduced by long time averaging methods—assuming the noise distribution remains the same.

By inventively combining the adaptive gating and dark noise correction techniques according to aspects of the present disclosure, a GmAPD based DTS system advantageously provides a sufficiently high dynamic range such that it may provide a longer measurement range than is possible with conventional, prior-art, LmAPD based DTS system.

FIG. 1 is a schematic block diagram of an illustrative SPC detector based HDR DTS system according to aspects of the present disclosure. With reference to that figure, we note that operationally, a laser pulse is generated and directed to a fiber under test. Portions of the light of the laser pulse directed into the fiber are backscattered in the fiber and collected through the effect of a circulator and then directed to a SPC detector. The SPC detector generates a pulse from detected photons. These pulses are ordered and resampled in desired time unit and accumulated over time such that statistics may be generated. Measured Stokes/Anti-stokes data is then used to generate temperature data after calibration.

Figure 2:
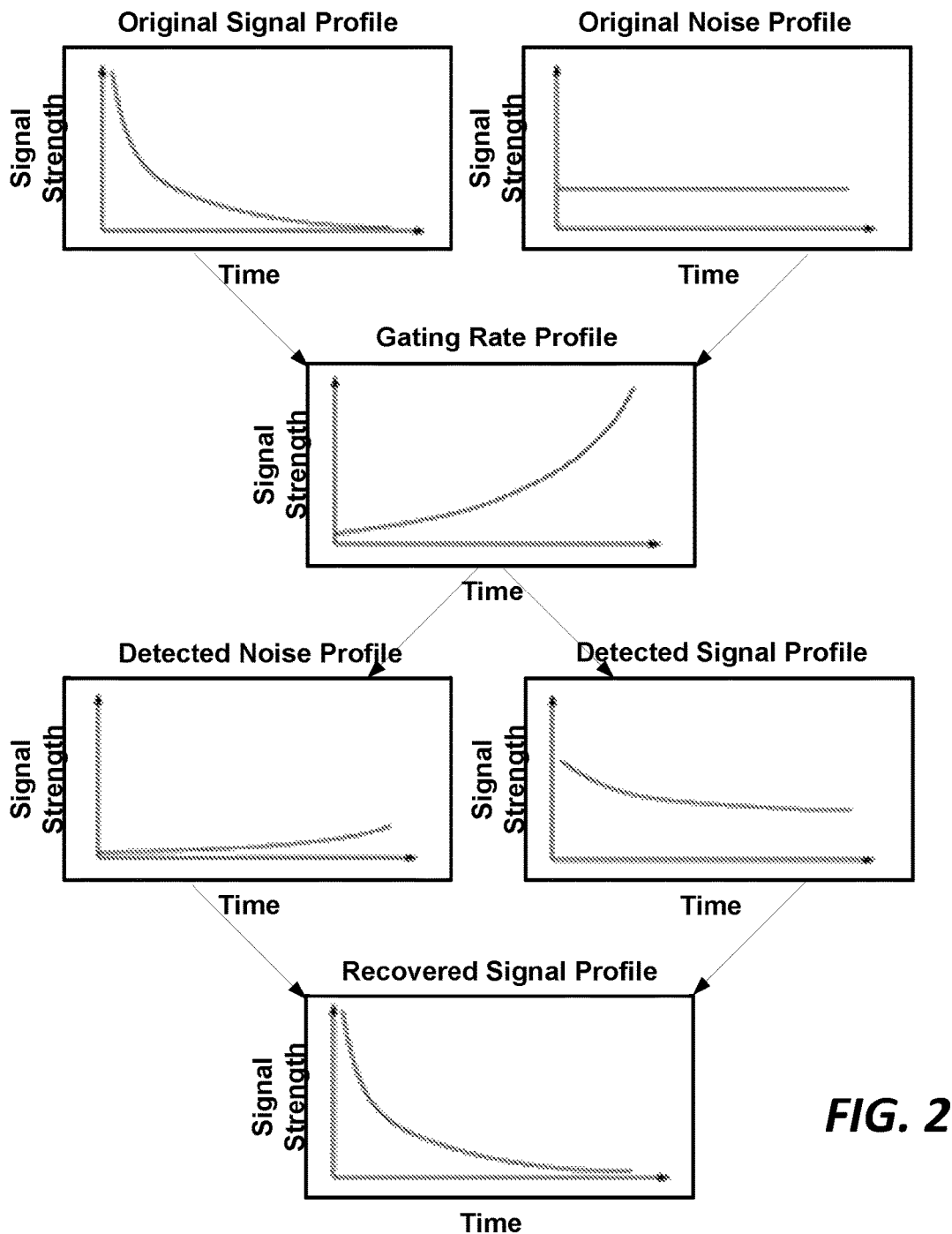
FIG. 2 is a block diagram showing a series of plots illustrating gating and data recovery processes for SPC detector based HDR DTS system according to aspects of the present disclosure.

FIG. 2 is a block diagram showing a series of plots illustrating gating and data recovery processes for SPC detector based HDR DTS system according to aspects of the present disclosure. As shown in that figure, an original signal is illustrated having an exponential decay of signal strength as one proceeds along a length of an optical fiber. Also shown in the figures is an original noise signal which exhibits a profile that is constant along the length of the optical fiber.

With continued reference to that figure, it may be observed that a gating rate signal is applied to the original signal and the original noise signal resulting in a detected signal and a detected noise signal having profiles as substantially shown. The gating rate signal so applied is inversely proportional to the original signal strength and therefore attenuates the original signal at near-end while enhancing it at a far-end—as illustratively shown in the figure as the detected signal profile and detected noise signal profile, respectively. The detected signal undergoes a correction of detector noise and detection efficiency caused by the gating scheme so applied. As a result, a recovered signal exhibits a true Stoke/Anti-stoke signal profile along a fiber such that a temperature profile can be computed afterwards.

As those skilled in the art will now understand and appreciate, systems, methods, and structures according to aspects of the present disclosure provide substantial advantages over prior-art approaches. First, our inventive use of GmAPD instead of a traditional LmAPD detector produces a 10~20 dB gain improvement of SNR for a far-end weak signal, thereby improving long range detectability. Second, our inventive gating scheme advantageously and surprisingly overcomes the "dead time" problem for GmAPD working in SPC mode that plagues Geiger mode operation. Third, and finally, our inventive use of post-processing advantageously allows our methods to correct any dark noise caused signal distortion.

At this point, while we have presented this disclosure using some specific examples, those skilled in the art will recognize that our teachings are not so limited. Accordingly, this disclosure should only be limited by the scope of the claims attached hereto.

The invention claimed is:

1. A distributed fiber optic sensing (DFOS) system for distributed temperature sensing (DTS) comprising:
the DTS system configured to measure the temperature along a length of optical fiber by providing laser light pulse(s) to the optical fiber and detecting Raman-based backscattered light, said backscattered light including temperature information in its intensity;
the DFOS system including a Geiger-mode avalanche photo detector (GmAPD) configured to operate in a single photon counting (SPC) mode, and a gating signal applied to the GmAPD such that a sensitivity of the GmAPD is limited in a high-intensity light condition;

the DFOS system CHARACTERIZED BY:

a gating signal applied to an output signal of the GmAPD, wherein such gating signal is inversely proportional to a detected light intensity such that the higher the detected light intensity the less sensitive the detection.

2. The system of claim 1 further CHARACTERIZED BY:
the rate of the gating signal is lower than an actual photon rate associated with a near-end of the optical fiber and higher than an actual photon rate associated with a far-end of the optical fiber.

3. The system of claim 2 further CHARACTERIZED BY:
a dark noise correction applied to the output signal of the GmAPD.

* * * * *